March 8, 1960 B. O. SKULDT 2,927,816
FOLDING TRAILERS
Filed Dec. 17, 1956 6 Sheets-Sheet 1

INVENTOR
BOYD O. SKULDT

BY Joseph G. Werner
ATTORNEY

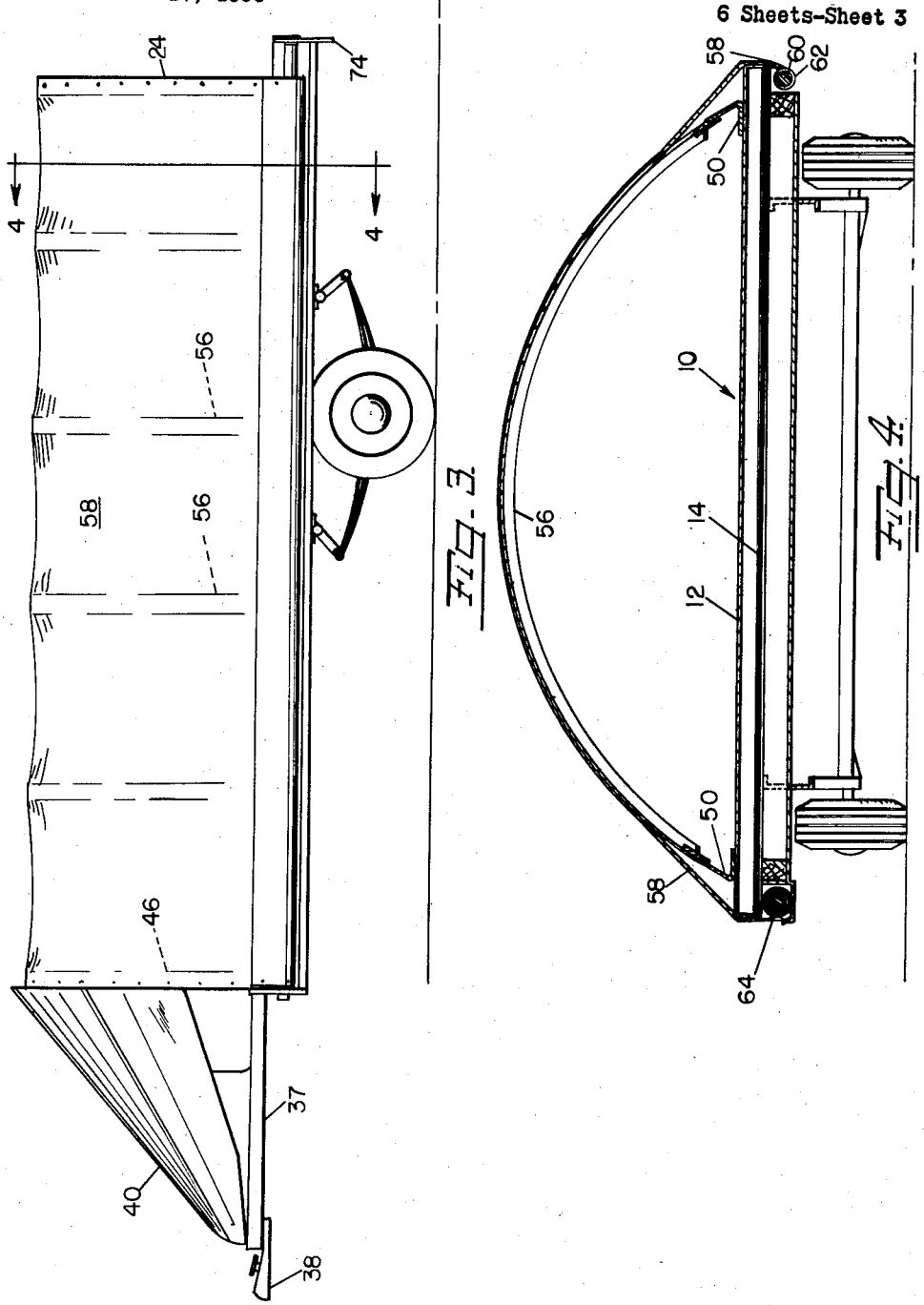

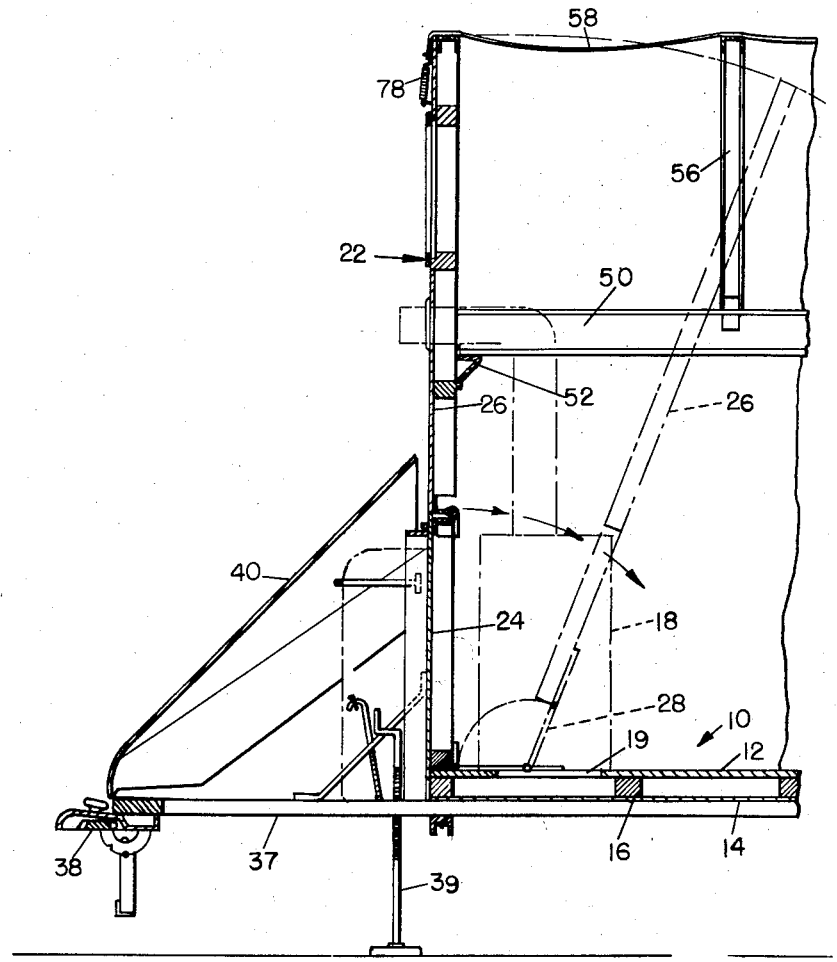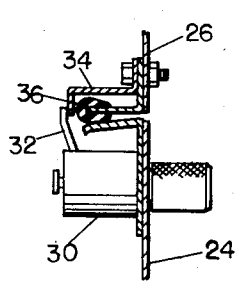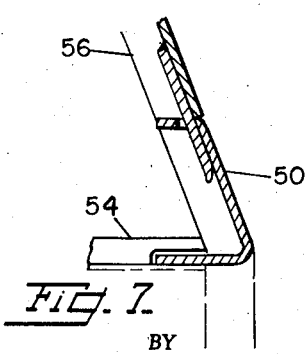

March 8, 1960    B. O. SKULDT    2,927,816
FOLDING TRAILERS
Filed Dec. 17, 1956    6 Sheets-Sheet 5

INVENTOR.
BOYD O. SKULDT
BY Joseph G. Werner
ATTORNEY

INVENTOR.
BOYD O. SKULDT
ATTORNEY.

United States Patent Office  2,927,816
Patented Mar. 8, 1960

2,927,816

FOLDING TRAILERS

Boyd O. Skuldt, Mount Horeb, Wis.

Application December 17, 1956, Serial No. 628,905

6 Claims. (Cl. 296—23)

The present invention relates to improvements in trailers and is concerned more particularly with trailers of the folding or collapsible type.

The principal object of the present invention is in general to improve and to simplify the construction of folding or collapsible trailers and to provide a comfortable, livable unit when the trailer is extended and a compact unit adapted for storage of various articles, such as camping gear or the like, when the trailer is in folded or collapsed condition.

A more particular object is to provide a trailer having a rearwardly extended portion which forms a porch or the like when the trailer is extended and which forms a frame and hinged closure member for the rear end of the trailer when the same is folded or collapsed.

Another particular object of the invention is to provide a trailer having a tarpaulin or other pliant sheet covering therefor which is applicable whether the trailer is extended or folded and wherein provision is made for convenient manipulation of the pliant sheet cover when the trailer is being extended or folded and compact retention of the end portions thereof.

A further particular object is to provide a heated collapsible trailer including a stove or the like with provision for the circulation of air for heating the trailer and having the folding portions of the trailer so constructed and arranged that the stove does not obstruct the folding or collapsing of the trailer.

Other objects and advantages will be apparent from the following detailed description taken in conjunction with the accompanying drawings wherein preferred embodiments of the principles of the invention have been selected for exemplification:

In the drawings:

Fig. 3 is a side elevation view of the trailer when folded or collapsed;

Fig. 4 is a sectional view taken on line 4—4 of Fig. 3;

Fig. 5 is a fragmentary sectional view taken on the line 5—5 of Fig. 1;

Fig. 6 is an enlarged detailed sectional view taken on the line 6—6 of Fig. 1;

Fig. 7 is an enlarged detailed sectional view taken on the line 7—7 of Fig. 1;

Figure 1:
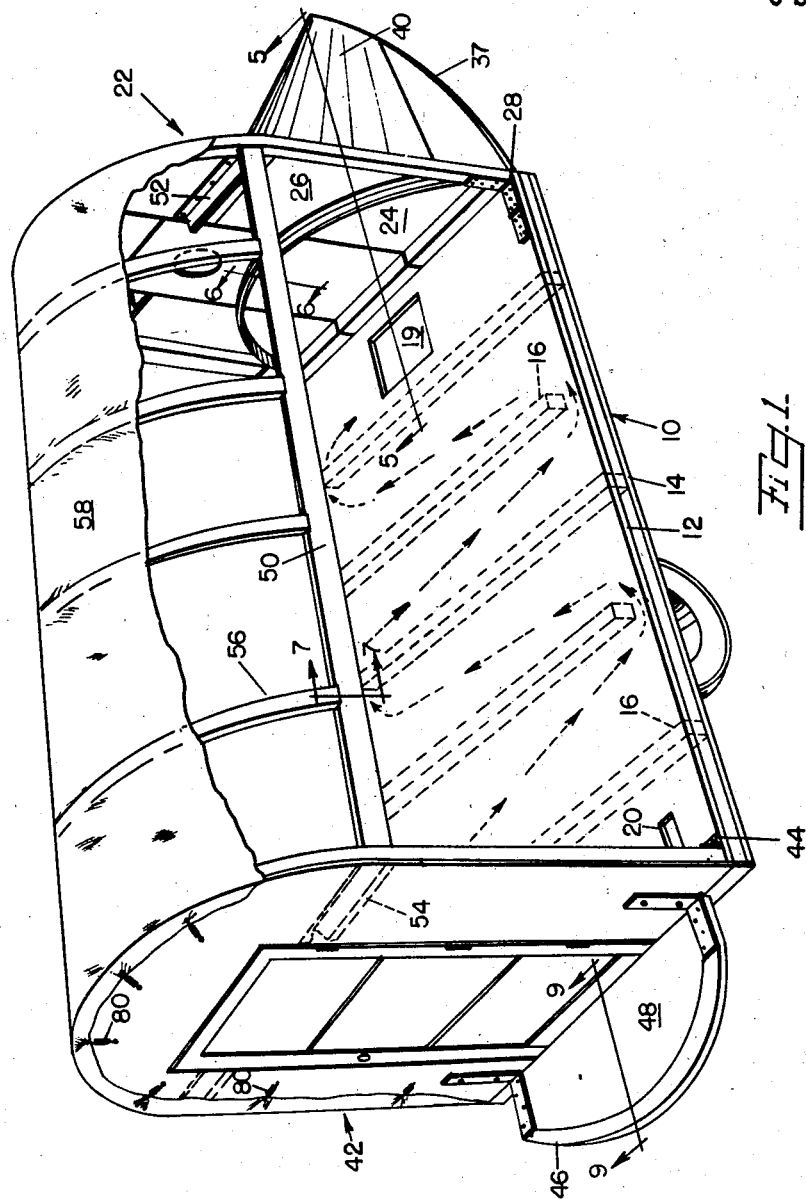
Fig. 1 is a side perspective view of a trailer constructed in accordance with the invention and shown in extended operative state with its cover partly broken away to disclose the interior thereof.
Figure 2:
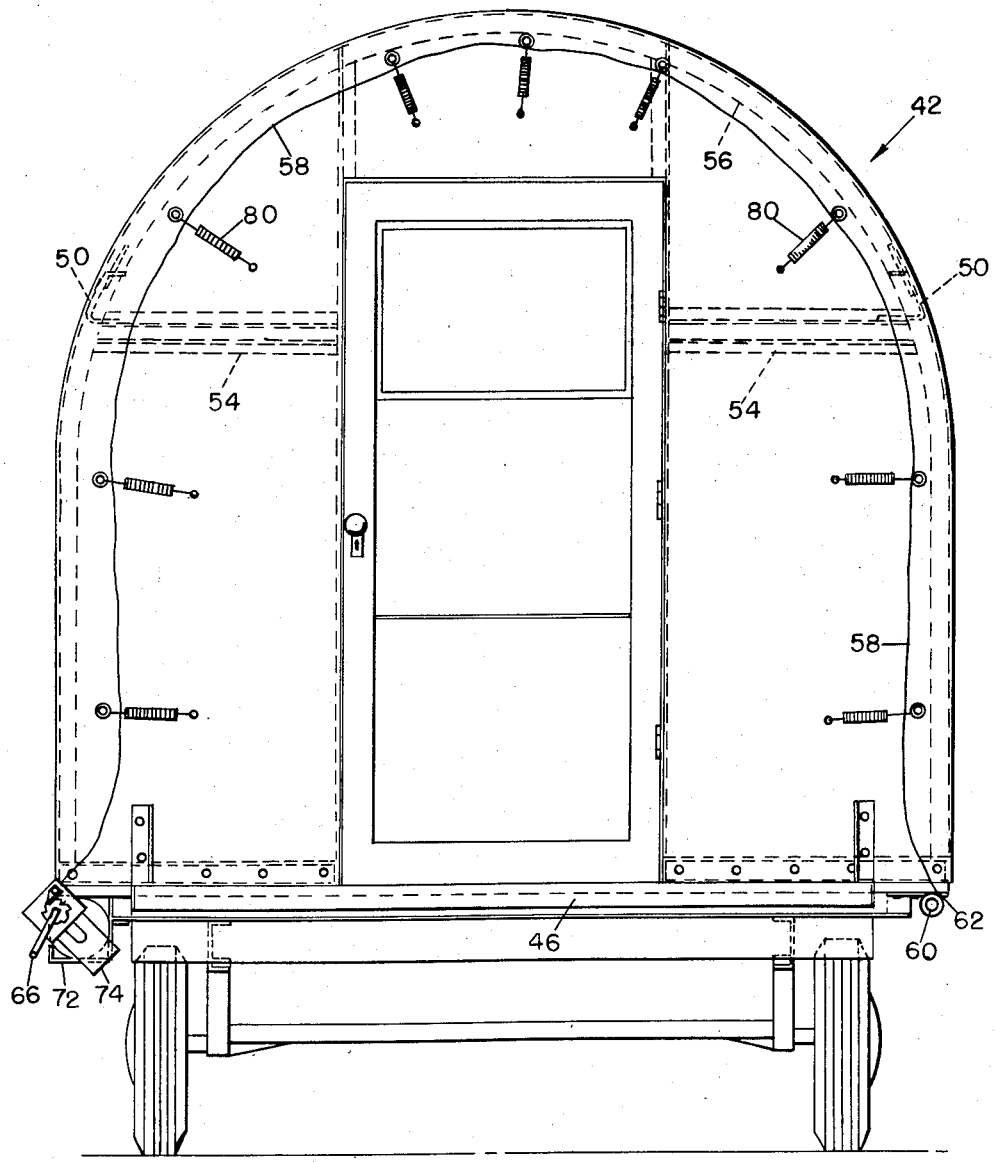
Fig. 2 is a rear end view of the trailer as shown in Fig. 1.

Referring more particularly to the drawings, wherein like numerals refer to like parts, the trailer therein shown has a floor designated in its entirety at 10 and carriage wheels of any suitable kind. In the form of the invention illustrated the floor 10 is a double floor composed of parallel upper and lower walls 12 and 14, respectively, and intermediate spacers 16. A suitable stove or other heating unit indicated at 18 is positioned over an opening 19 at the forward end of the floor 10 and openings 20 are provided at the rearward end of the floor through which heated air is drawn by the normal draft of the stove and passed between the flooring walls 12 and 14 as indicated by the arrows in Fig. 1 so as to heat the trailer floor. When trailer heating means is not desired it will not be necessary to employ the double floor construction as shown at 12, 14 and 16 and the invention accordingly contemplates the provision of a single wall floor of any suitable material if so desired.

The front wall of the trailer indicated in its entirety at 22 is composed of a fixed upright arcuate front wall section 24 secured to the front end of the floor 10. Complementing the fixed arcuate wall section 24 to form the complete upright front wall 22 is a hinged front wall section 26 which is secured to the front end of the floor 10 by hinges 28. When the stove 18 is employed the hinges 28 are preferably of the double pivot type so that when the wall 26 is to be folded inwardly the wall may be elevated sufficiently to clear the stove 18 as shown by the broken lines in Fig. 5. When the trailer is in extended or erected state the fixed front wall section 24 and the hinged section 26 are secured in vertical alignment by suitable means such as the pawl 30 as shown in Fig. 6 which is carried by the wall section 24 and includes a keeper 32 for engaging a bracket 34 fixed to the hinged wall section 26. The junction between the wall sections 24 and 26 is desirably sealed off with a stripping 36 of rubber or other suitable material to provide an airtight front wall.

The trailer frame has a portion projecting forwardly of the front wall 22 as shown at 37 which carries a suitable trailer hitch as indicated at 38 and a jack or the like 39 is provided for supporting the front end of the trailer when the same is disengaged from its towing vehicle. A shield 40 is preferably provided over the forwardly extending front panel 37 to act as a wind breaker and to cooperate with the panel 37 to protect the fixed front wall section 24 from stones, wet asphalt, or the like when the trailer is in forward motion. The space between the panel 37 and the cover 40 also provides a convenient storage area such as for a fuel oil tank and an electric power unit for the trailer.

Figure 9:
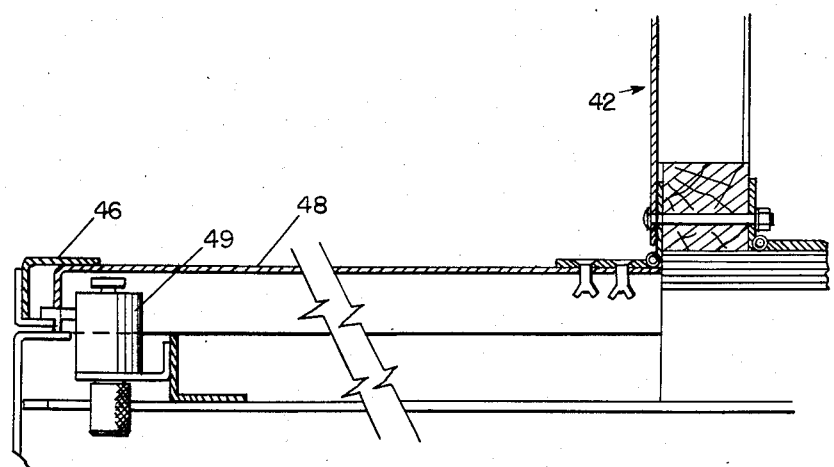
Fig. 9 is an enlarged fragmentary sectional view taken on line 9—9 of Fig. 1.

The rear wall of the trailer indicated in its entirety at 42 is secured to the rear end of the floor 10 by hinges 44 so that the wall 42 may be folded inwardly adjacent the floor 10 when the trailer is collapsed. A right angled arcuate frame member 46 is fixed to the bottom of the rear wall 42 and when the wall 42 is folded downwardly the frame member 46 will be elevated to form an upright rear wall section which in general matches the fixed front wall section 24 so that when the trailer is folded or collapsed as shown in Figs. 3 and 4 a symmetrical appearance will be provided. A hinged plate 48 is carried at the rear end of the trailer floor 10 so as to be framed by the member 46, and selectively secured thereto by the pawl and keeper means indicated at 49 in Fig. 9. It will be apparent that when the rear wall 42 is in upright erected position the rearwardly extending frame 46 and plate 48 will provide a rear porch or platform for the trailer and that when the rear wall 42 is folded inwardly and the frame 46 is upright the plate 48 will provide a hinged closure member for the rear end of the trailer when the same is in a folded or collapsed state thus to provide convenient access to the interior thereof.

Forming a roof frame for the trailer are opposed channel shaped stringer arms 50 extending lengthwise at opposed sides of the trailer and supported when the trailer is extended or erected by brackets 52 and 54 carried by opposed upper sides of the hinged front wall section 26 and the rear wall 42, respectively. A plurality of arcuate cross-ribs 56 are removably supported by the opposed stringer arms 50 preferably in the manner shown in Fig. 7 and extend transversely of the same to form an arched roof frame for the trailer. The stringer arms 50 and cross ribs 56 are removably supported by the walls 26 and 42 so that when these walls are folded inwardly and the trailer is collapsed the roof frame members may be supported by the floor 10. The arcuate cross-ribs 56 preferably match the upper edges of the arcuate fixed front wall section 24 and the upright rear frame member 46 further to preserve the symmetrical appearance of the trailer in folded or collapsed state as reflected in Figs. 3 and 4.

Figure 8:
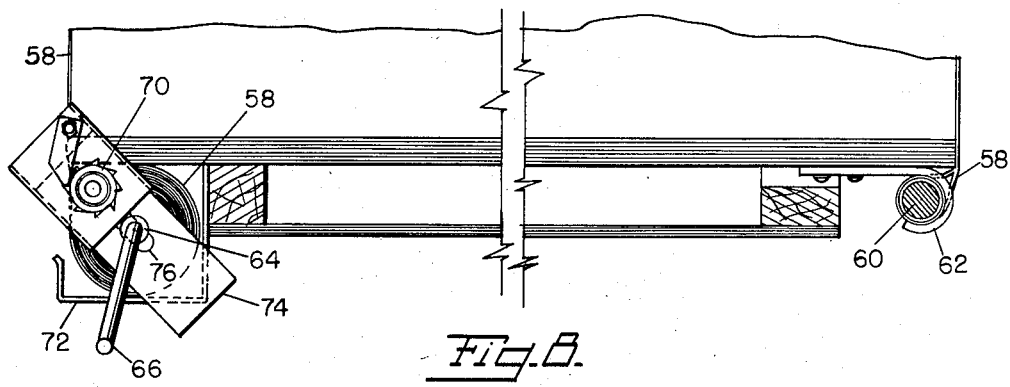
Fig. 8 is an enlarged end view of the rear end fragment of the trailer with the rear end extension broken away.

The trailer roof is preferably in the form of a pliant cover or waterproof tarpaulin 58. One end of the cover 58 is suitably secured along one side of the trailer floor and a convenient manner of effecting this is to provide a sewn end pocket for the cover for receiving a rod 60 which is secured under the side edge of the floor 10 by spaced hooks 62 as best shown in Fig. 8. The opposed end of the cover 58 is secured to a spool 64 having an end handle 66 whereby to wind or to unwind the cover on or from the spool. A pawl and ratchet arrangement 70 is provided so that the cover 58 may be pulled taut in either extended or collapsed condition of the trailer, drawing the roller against the bottom side of the floor, and sealing the cover against the side edges of the floor. The roller 64 may be supported in brackets 72 carried beneath the floor 10 at the side thereof opposed to the hooks 62. End plates 74 are carried by the end brackets 72 for supporting the ends of the roller 64 and are preferably provided with elongated slots as shown at 76 in Fig. 8 which permit the roller 64 to slide along the elongated walls of the slots thus to allow for an increase in the diameter of the roller as the cover is rolled around it or a decrease in its diameter as the cover is pulled off. Spring clips or the like 78 and 80 may be secured to the front and rear walls 22 and 42, respectively, to engage and retain the front and rear ends of the cover 58.

Figure 10:
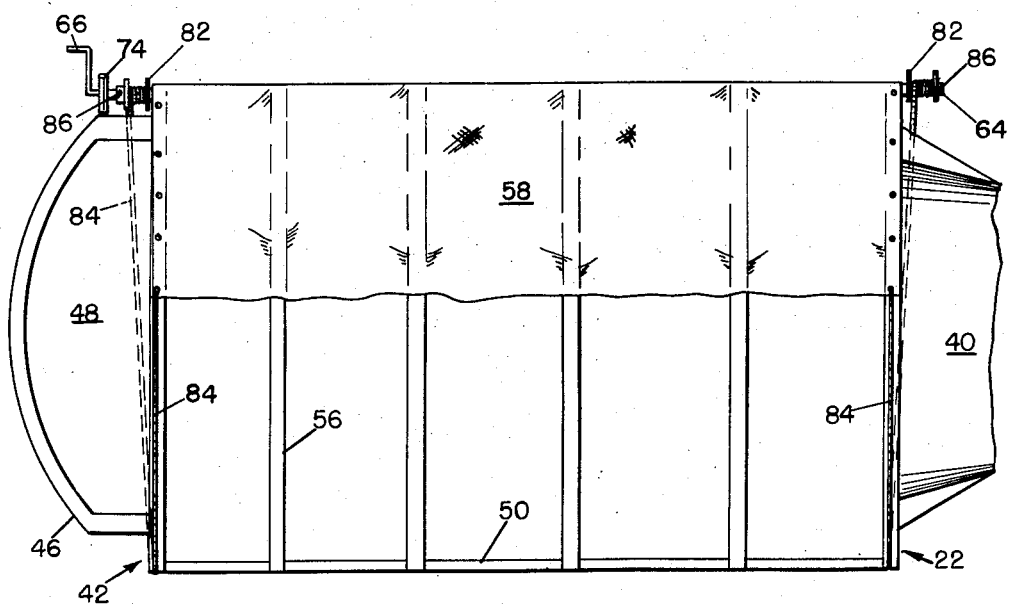
Fig. 10 is a top plan view of a modified form of the invention wherein trailer cover hoisting means are provided.
Figure 11:
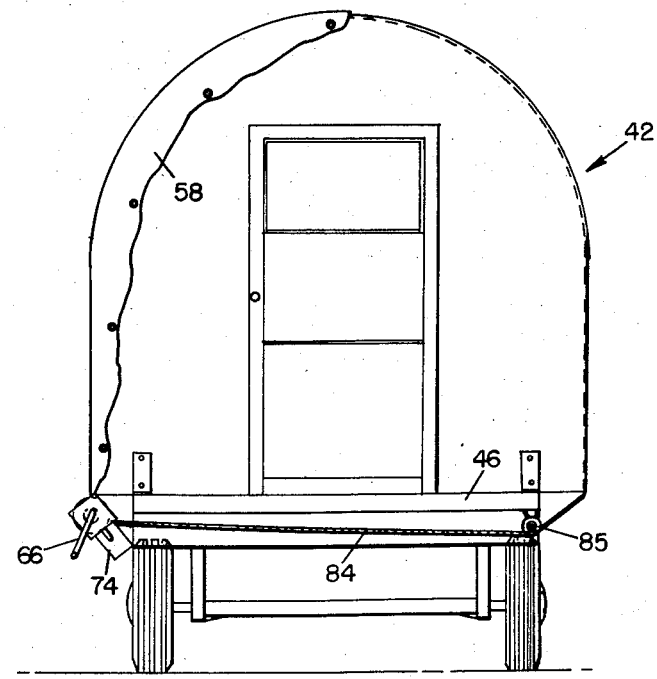
Fig. 11 is a rear end view of the trailer shown in Fig. 10 with the cover in partial enclosing position.

In the modified form of the invention shown in Figs. 10 and 11 semiautomatic means are provided for pulling the tarpaulin or cover member 58 over the roof ribs 56 and the end walls 22 and 42 when the trailer is in erected position. As shown, cable holders 82 and cables 84 are provided at opposed extended ends of the spool 64. The cables 84 extend beneath the floor of the trailer to pulleys 85 at its opposite side and then upwardly in grooves provided at the sides and tops of the end walls 22 and 42. The free ends of the cables 84 are secured to the free end of the cover 58 so that when the crank 66 is rotated the cover 58 will be pulled from the spool 64 by the cables 84 upwardly and over the roof frame members of the trailer. The cable holders 82 are provided with set screws 86 which may be loosened to permit the holders to run freely on the spool 64 when the cables are extended for attachment to the tarpaulin cover.

It is to be understood that the present invention is not confined to the precise constructions and arrangements of parts herein illustrated and described but embraces all such modifications thereof as come within the scope of the following claims.

I claim:

1. A folding trailer comprising, a floor having front and rear ends, a fixed upright front wall section at the front end of said floor, a hinged front wall section at said front end complementing said fixed upright wall section to form an upright front wall, a hinged rear wall, the said hinged front wall section and rear wall being adapted to be folded inwardly toward said floor from upright operative position, a right angled extension member fixed to said hinged rear wall, the said extension member forming a rearward extension for said floor when the rear wall is in upright operative position and forming an upright rear wall section when said rear wall is folded inwardly, stringer arms extending lengthwise at opposed sides of said floor, means carried by said front and rear walls for supporting said stringer arms upwardly of said floor, cross roof supporting ribs carried by said stringer arms, the said stringer arms and cross ribs being adapted selectively to be supported above said floor when the trailer is erected with said front and rear walls in upright operative position and supported adjacent said floor when the trailer is collapsed with said front and rear walls in folded inoperative position, and a pliant cover for said trailer secured along opposed sides of said floor and extending over said stringer arms and cross ribs when the trailer is either extended or collapsed, the front and rear ends of said cover being adapted to be secured to said front and rear walls when the trailer is extended and to said upright front and rear wall sections when the trailer is collapsed.

2. The trailer of claim 1 additionally including crank and roller means securing said pliant cover at one side of said trailer.

3. The trailer of claim 2 additionally including an elongated track for said roller whereby to permit movement of said roller in a radial direction as said pliant cover is wound or unwound.

4. A folding trailer comprising, a floor having front and rear ends, a fixed upright front wall section at the front end of said floor, a hinged front wall section at said front end complementing said fixed upright wall section to form an upright front wall, a hinged rear wall, the said hinged front wall section and rear wall being adapted to be folded inwardly toward said floor from upright operative position, a right angled frame member fixed to said hinged rear wall, the said frame member forming a rearwardly extending porch frame for said floor when the rear wall is in upright operative position and forming an upright rear wall section when said rear wall is folded inwardly, stringer arms extending lengthwise at opposed sides of said floor, means carried by said front and rear walls for supporting said stringer arms upwardly of said floor, cross roof supporting ribs carried by said stringer arms, the said stringer arms and cross ribs being adapted selectively to be supported above said floor when the trailer is erected with said front and rear walls in upright operative position and supported adjacent said floor when the trailer is collapsed with said front and rear walls in folded inoperative position, and a pliant cover for said trailer secured along opposed sides of said floor and extending over said stringer arms and cross ribs when the trailer is either extended or collapsed, the front and rear ends of said cover being adapted to be secured to said front and rear walls when the trailer is extended and to said upright front and rear wall sections when the trailer is collapsed.

5. The trailer of claim 4 additionally including a hinged plate carried at the rear end of the floor and framed by the right angled frame member, the said plate providing a rearwardly extending porch when the rear wall is in upright position and the trailer is extended and a hinged closure for the upright rear wall section when the rear wall is folded inwardly and the trailer is collapsed.

6. A folding trailer comprising, a floor having front and rear ends, an upright front wall at the front end of said floor, a hinged rear wall at the rear end of said floor, the said rear wall being adapted to be folded inwardly toward said floor from upright operative position, a right angled frame member fixed to said hinged rear wall, the said frame member forming a rearwardly extending porch frame for said floor when the rear wall is in upright operative position and forming an upright rear wall section when said rear wall is folded inwardly and a hinged plate carried by the rear end of said floor and framed by said right angled frame member, the said plate providing a rearwardly extending porch when said rear wall is in upright position and the trailer is extended and a hinged closure at the rear end of the trailer when said rear wall is folded inwardly and the trailer is collapsed.

References Cited in the file of this patent

UNITED STATES PATENTS

| | | |
|---|---|---|
| 1,238,360 | Surber | Aug. 28, 1917 |
| 2,038,001 | Redding | Apr. 21, 1936 |
| 2,154,365 | Taylor | Apr. 11, 1939 |
| 2,326,318 | Anderson | Aug. 10, 1943 |
| 2,475,928 | Walls | July 12, 1949 |
| 2,587,871 | May et al. | Mar. 4, 1952 |